United States Patent
Wilson et al.

(10) Patent No.: US 9,936,496 B2
(45) Date of Patent: Apr. 3, 2018

(54) ALLOCATION OF SUB-CHANNELS OF MIMO CHANNELS USING A BASESTATION WITH A PLURALITY OF SECTORS

(71) Applicant: Apple Inc., Cupertino, CA (US)

(72) Inventors: Fiona Wilson, Spellbrook (GB); Keith Wilson, Bishops Stortford (GB)

(73) Assignee: Apple Inc., Cupertino, CA (US)

( * ) Notice: Subject to any disclaimer, the term of this patent is extended or adjusted under 35 U.S.C. 154(b) by 675 days.

(21) Appl. No.: 14/450,777

(22) Filed: Aug. 4, 2014

(65) Prior Publication Data

US 2014/0341169 A1    Nov. 20, 2014

Related U.S. Application Data

(63) Continuation of application No. 14/106,201, filed on Dec. 13, 2013, now Pat. No. 8,798,683, which is a (Continued)

(51) Int. Cl.
| | |
|---|---|
| *H04B 7/04* | (2017.01) |
| *H04W 72/04* | (2009.01) |
| *H04B 7/0417* | (2017.01) |
| *H04B 7/0491* | (2017.01) |
| *H04B 7/06* | (2006.01) |

(Continued)

(52) U.S. Cl.
CPC ........ *H04W 72/044* (2013.01); *H04B 7/0413* (2013.01); *H04B 7/0417* (2013.01); *H04B 7/0491* (2013.01); *H04B 7/0632* (2013.01); *H04L 5/006* (2013.01); *H04L 5/0023* (2013.01); *H04L 5/0035* (2013.01); *H04L 5/0037* (2013.01); *H04L 5/0085* (2013.01); *H04L 5/0094* (2013.01); *H04L 5/02* (2013.01);
(Continued)

(58) Field of Classification Search
CPC .... H04B 7/022; H04B 7/0413; H04B 7/0417; H04B 7/0491; H04L 5/0035; H04L 5/0037; H04L 5/006; H04L 5/0085; H04W 36/18; H04W 72/044; H04W 72/1231; H04W 88/08
USPC .................................................. 370/328, 329
See application file for complete search history.

(56) References Cited

U.S. PATENT DOCUMENTS

| | | |
|---|---|---|
| 6,072,988 A | 6/2000 | Minegishi |
| 6,078,815 A | 6/2000 | Edwards |

(Continued)

OTHER PUBLICATIONS

U.S. Appl. No. 14/106,201, filed Dec. 13, 2013, Fiona Wilson.
U.S. Appl. No. 12/791,366, filed Jun. 1, 2010, Fiona Wilson.

*Primary Examiner* — Andrew Lai
*Assistant Examiner* — Mahmudul Hasan
(74) *Attorney, Agent, or Firm* — Meyertons, Hood, Kivlin, Kowert & Goetzel, P.C.

(57) ABSTRACT

A base station for wireless network uses one or more MIMO channels having subchannels, to communicate with multiple user equipments, and allocates the sub channels to the user equipments. Different subchannels of a given one of the channels can be allocated to different user equipments. The ability to allocate sub channels individually rather than only allocating entire channels can enable higher data rates to be achieved. This is particularly useful for improving data rates at cell boundaries or sector boundaries, where the coverage is traditionally weakest. A user equipment can use subchannels from different MIMO channels from different sectors or from different base stations.

20 Claims, 4 Drawing Sheets

Related U.S. Application Data continuation of application No. 12/791,366, filed on Jun. 1, 2010, now Pat. No. 8,626,241, which is a continuation of application No. 10/360,486, filed on Feb. 6, 2003, now abandoned.

(51) Int. Cl.
| | | |
|---|---|---|
| *H04L 5/00* | (2006.01) | |
| *H04L 5/02* | (2006.01) | |
| *H04W 72/12* | (2009.01) | |
| *H04B 7/0413* | (2017.01) | |
| *H04B 7/022* | (2017.01) | |
| *H04W 36/18* | (2009.01) | |
| *H04W 88/08* | (2009.01) | |

(52) U.S. Cl.
CPC ......... *H04W 72/1231* (2013.01); *H04B 7/022* (2013.01); *H04W 36/18* (2013.01); *H04W 88/08* (2013.01)

(56) References Cited

U.S. PATENT DOCUMENTS

| | | | |
|---|---|---|---|
| 6,542,736 B1 * | 4/2003 | Parkvall | H04W 28/20 370/465 |
| 6,594,245 B1 | 7/2003 | Rimhagen | |
| 6,631,124 B1 | 10/2003 | Koorapaty | |
| 6,870,808 B1 * | 3/2005 | Liu | H04L 5/023 370/203 |
| 6,940,827 B2 * | 9/2005 | Li | H04B 1/707 370/278 |
| 2002/0085643 A1 * | 7/2002 | Kitchener | H04B 7/0417 375/267 |
| 2002/0122383 A1 * | 9/2002 | Wu | H04B 7/0417 370/210 |
| 2002/0154705 A1 * | 10/2002 | Walton | H04B 7/0417 375/267 |
| 2003/0003863 A1 | 1/2003 | Thielecke | |
| 2003/0013451 A1 * | 1/2003 | Walton | H04W 16/04 455/447 |
| 2003/0021245 A1 | 1/2003 | Haumonte | |
| 2003/0087673 A1 * | 5/2003 | Walton | H04B 7/0452 455/562.1 |
| 2003/0123425 A1 * | 7/2003 | Walton | H04W 52/24 370/341 |
| 2003/0128658 A1 * | 7/2003 | Walton | H04L 1/06 370/208 |
| 2003/0235147 A1 * | 12/2003 | Walton | H04B 7/04 370/204 |
| 2004/0066754 A1 | 4/2004 | Hottinen | |
| 2004/0071110 A1 | 4/2004 | Guey | |
| 2004/0081080 A1 | 4/2004 | Ji | |
| 2004/0081123 A1 * | 4/2004 | Krishnan | H04L 1/0004 370/329 |
| 2004/0086027 A1 | 5/2004 | Shattil | |
| 2004/0095907 A1 * | 5/2004 | Agee | H04B 7/0417 370/334 |
| 2004/0203806 A1 | 10/2004 | Craig | |
| 2004/0252632 A1 | 12/2004 | Bourdoux | |
| 2005/0207505 A1 | 9/2005 | Lakkis | |

* cited by examiner

PRIOR ART MIMO

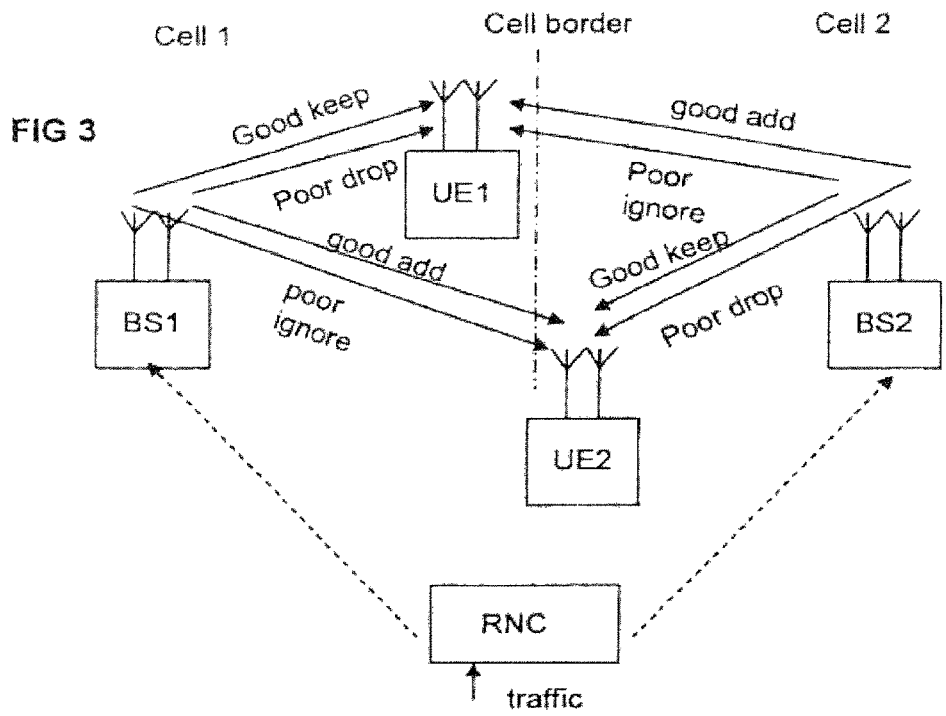
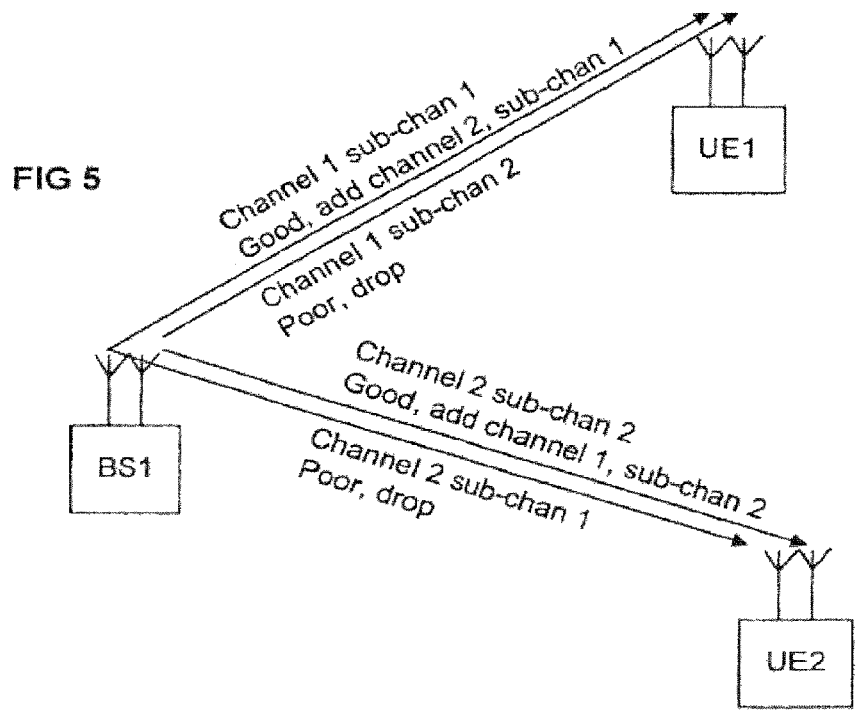

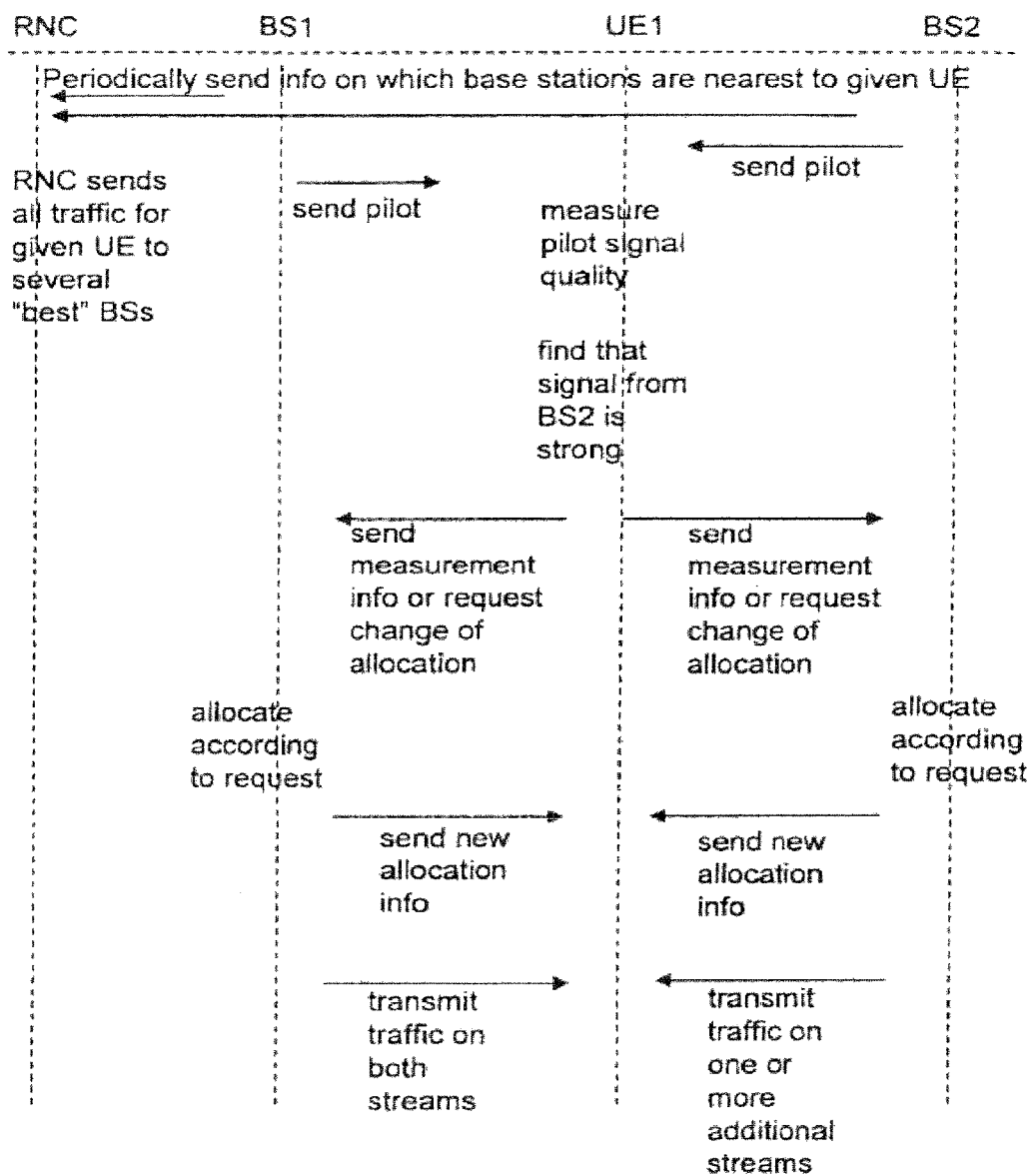

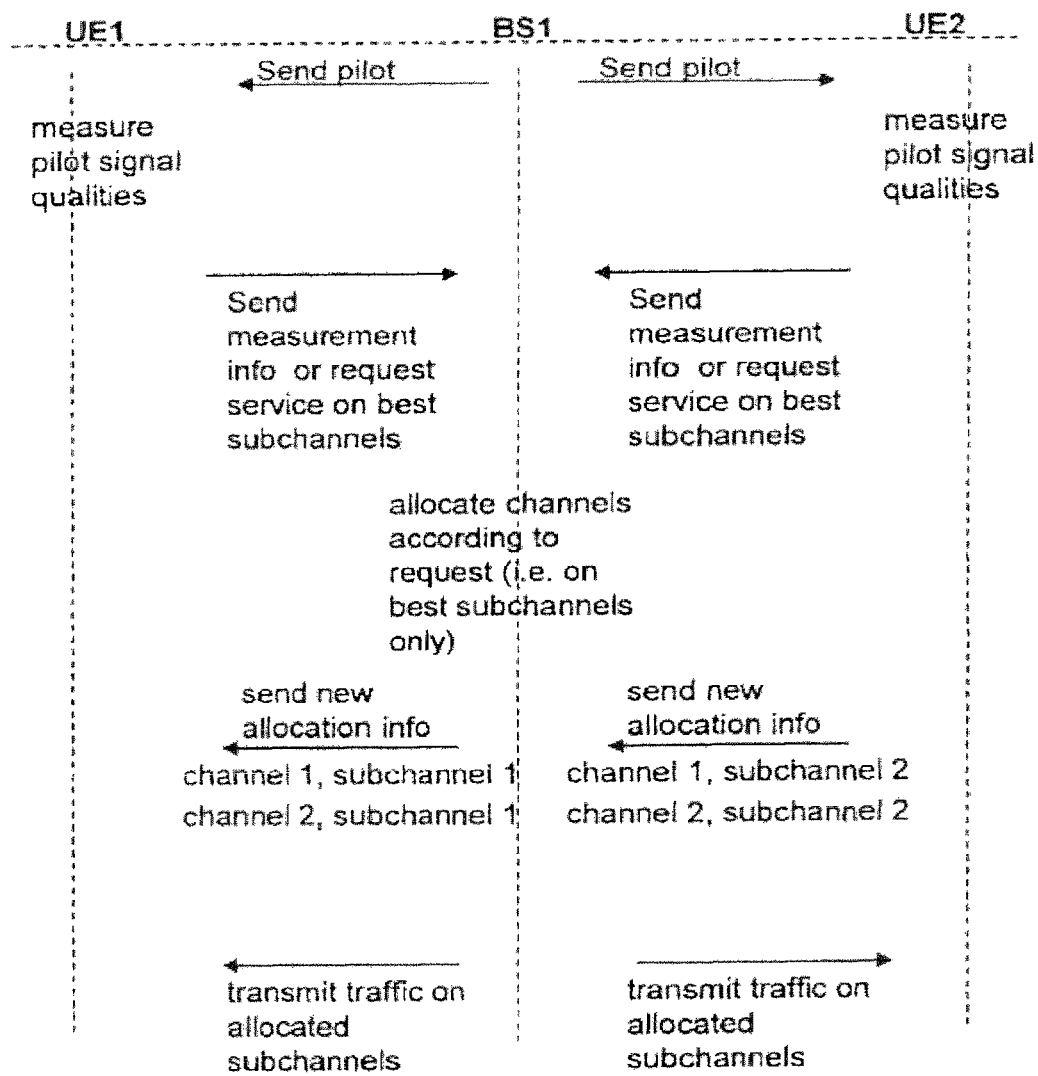

ALLOCATION OF SUB-CHANNELS OF MIMO CHANNELS USING A BASESTATION WITH A PLURALITY OF SECTORS

CROSS-REFERENCE TO RELATED APPLICATIONS

This application is a continuation of U.S. patent application Ser. No. 14/106,201, filed Dec. 13, 2013, entitled "Allocation of Sub Channels of MIMO Channels of a Wireless Network", invented by Fiona Wilson and Keith S. Wilson, which is a continuation of U.S. patent application Ser. No. 12/791,366, filed Jun. 1, 2010, entitled "Allocation of Sub Channels of MIMO Channels of a Wireless Network", invented by Fiona Wilson and Keith S. Wilson, which is a continuation of U.S. patent application Ser. No. 10/360,486, filed Feb. 6, 2003. All of the above-named applications are hereby incorporated by reference in their entireties as though fully and completely set forth herein.

FIELD

This invention relates to base stations for wireless networks, to user equipments for wireless networks, to methods of allocating sub channels and to methods of offering a data transmission over such networks.

BACKGROUND

A MIMO (Multiple Input, multiple output) wireless communication system (see FIG. 1) is one which comprises a plurality of antennas at the transmitter and one or more antennas at the receiver. The antennas are employed in a multi-path rich environment such that due to the presence of various scattering objects (buildings, cars, hills, etc.) in the environment, each signal experiences multipath propagation. Thus there are numerous scattered signals between the transmit and receive antennas. User data is transmitted from the transmit antennas using a MIMO transmission method, for example space-time coding (STC) or BLAST as is known in the art, typically with many channels separated by frequency, time slots, or coding. The receive antennas capture the transmitted signals and a signal processing technique is then applied as known in the art, to separate the transmitted signals and recover the user data. FIG. 1 shows a base station BS1 having two or more spatially separated antennas, transmitting to corresponding antennas on user equipment UE1. It is not untypical for one of the MIMO channels to have much better reception than the other, despite the close proximity of the respective antennas.

MIMO wireless communication systems are advantageous in that they enable the capacity of the wireless link between the transmitter and receiver to be improved compared with previous systems in the respect that higher data rates can be obtained. The multipath rich environment enables multiple channels (these are what are referred to as sub-channels in the remainder of the document) to be transmitted between the transmitter and receiver, and distinguished at, the receiver only by the spatial characteristics, even though the same frequency, code or time slot is used. Even line of sight signals can potentially be separated into MIMO sub channels based on spatial characteristics. Data for a single user can then be transmitted over several paths in the air by inverse multiplexing the data into several streams. These are transmitted simultaneously using the same frequency or time slots or codes, and remultiplexed at the receiver. Consequently, higher spectral efficiencies are achieved than with non-MIMO systems.

Also, as the multipath characteristic varies with time, especially for mobile users, adaptive modulation coding (AMC) can be used to achieve higher data rates where the multipath and interference and noise allow. Conventional hand off techniques are used in cell based MIMO systems to hand off all streams of a MIMO channel to a neighboring base station. The trigger for such a "hard" hand off is usually a signal strength indication of the downlink, measured at the user equipment.

US Patent Application 20030003863 shows link adaptation for MIMO transmission schemes. Information to be transmitted is divided into a plurality of subsignals (defined as the signal carried on a subchannel). In the receiver the different receive signals are processed so that subsignals are detected and decoded and the contribution of each detected and decoded subsignal is subtracted from the receive signals. A feedback channel from receiver to transmitter is used to send control information to the transmitter to optimize the usage of the MIMO channel. In the receiver, the link quality of each subsignal is determined and is transmitted to the receiver via the feedback channel. In the transmitter, the link quality information can be used to vary the data rate of each subsignal, vary the transmit power of each subsignal, vary the modulation scheme of each subsignal, vary the coding scheme of each subsignal or vary any combination of these properties. Furthermore, the link quality determination may be based on an error rate measurement, a noise ratio measurement, or a capacity measurement. The link quality measurement may be fast-adaptive, e.g. when it is based on the instantaneous calculated capacities of each subsignal. Fast means that the measurement period is shorter or substantially equal to the time period in which fast fading becomes relevant. As fast fading is dependant on the Doppler shift of the signal, the time period is also dependent on the velocity a receiver moves relative to the transmitter. For slow-adaptive embodiments a capacity calculation based on an average of the calculated capacities of each layer with respect to a longer time period or a capacity calculation that takes the outage of the calculated capacities of each layer with respect to a longer time period, may be applied.

One limitation with existing MIMO systems concerns the large size of the transmit and receive antenna arrays. Another limitation with existing MIMO systems is that they are designed for use in environments where scattering occurs rather than for line of sight situations. More significant in many cases are the following limitations:

a) The coverage of MIMO systems can be very uneven. MIMO provides much improved data rates for users with good C/I, typically near the base station, but provides little improvement to users in a poor C/I situation (typically at cell edges) so their data rate remains low.

b) The 'sub-channels' of a MIMO system often have very uneven capacity. This is dependent on the propagation characteristics of the channel and can be particularly uneven in a propagation environment where one multipath component is very dominant. These poor quality sub-channels are used to provide a very small additional data rate to the user which is wasteful.

SUMMARY

It is an object of the present invention to provide improved apparatus and methods. According to a first aspect of the present invention, there is provided a base station for a wireless network for communicating over one or more channels to multiple user equipments, at least one of the channels having sub channels distinguishable by spatial separation of transmitters of the respective sub Channels, the base station having an allocator for allocating the sub channels to the user equipments, the allocator being arranged to allocate different subchannels of a given one of the channels to different user equipments.

Notably, the ability to allocate sub channels individually, rather than only allocating entire channels can enable higher data rates to be achieved. It is based on a recognition that different sub channels can support widely differing data rates to a given user equipment, so it might be more efficient to reallocate a sub channel having a lower data rate to a different user equipment for which it can achieve a higher data rate. This is particularly useful for improving data rates at cell boundaries or sector boundaries, where the coverage is traditionally weakest. The channels can be MIMO, for use with MIMO capable user equipment or MISO (Multiple input single Output) with appropriate signal processing at the receiver.

In principle, an alternative is to make the allocation at the user equipment. It is usually more convenient to make the allocation at the transmitter side, which is the base station for the downlink. This is preferred because the base station has information on the signal quality and data rate requirements of all users so it can allocate MIMO subchannels based upon that more complete knowledge of the network. The allocation for the uplink can follow the downlink allocation or be allocated independently. The latter is preferred if the fading characteristics of the propagation channel has low correlation between the uplink and downlink. If there is good correlation between uplink and downlink fading, then using the downlink allocation will be a good approximation.

The base station can be of any type. It need not necessarily be at a fixed location, and can be distributed or incorporated partly into mobile terminals in principle, without losing the advantages set out above.

An additional feature of some embodiments is the base station being arranged to cooperate with a neighboring base station to enable subchannels from both base stations to be allocated to the same user equipment. This is particularly useful for user equipment near the boundary of coverage from two base stations.

An additional feature of some embodiments is the allocator being arranged to allocate the sub channels for downlinks according to information relating to sub channel signal quality received from the user equipment. This can help ensure the allocation is made with the best information available.

An additional feature of some embodiments is the information comprising signal quality measurements of sub channels allocated to the user equipment, and sub channels available but not allocated. This is the "raw" information useful for optimizing the allocation.

An additional feature of some embodiments is the information comprising a request to allocate a different sub channel. This is intended to cover the option of the "raw" information being processed in the user equipment so that less information need be passed to the base station.

An additional feature of some embodiments is different transmitters for different sectors, the allocator being arranged to allocate sub channels from more than one sector to the same user equipment. This is particularly useful for user equipment located near the boundary of sectors.

An additional feature of some embodiments is a signal quality detector for measuring signal quality of uplinks, the allocator using these measurements to allocate sub channels for the uplink. Independent allocation of uplinks can improve overall efficiency.

An additional feature of some embodiments is the base station being arranged to adapt modulation and/or coding of the sub channels. This can further help improve coverage at the highest data rates. The adaptation can be on the basis of measurements of signal quality.

The invention also provides a user equipment for communicating with a base station of a wireless network over multiple channels, at least sonic of the channels having sub channels distinguishable by spatial separation of transmitters of the respective sub channels, the user equipment having a signal quality detector for measuring the signal quality of sub channels, and being arranged to use subchannels selected from more than one of the channels.

This is notable for enabling more efficient use of potential available capacity.

An additional feature of some embodiments is comparing sub channels from different base stations.

An additional feature of some embodiments is comparing sub channels from different sectors of a base station.

An additional feature of some embodiments is sending signal quality measurements of the sub channels to the base station.

The invention also provides an allocator for the base station, in the form of software. This acknowledges that software can be a valuable, separately tradable commodity. It is intended to encompass software, which runs on or controls "dumb" or standard hardware, to carry out the desired functions. For similar reasons, it is also intended to encompass software which "describes" or defines the configuration of hardware, such as HDL (hardware description language) software, as is used for designing silicon chips, or for configuring universal programmable chips, to carry out desired functions.

The invention also provides a method of allocating sub channels in a wireless network having multiple channels between a base station and multiple user equipments, at least some of the channels having sub channels distinguishable by spatial separation of transmitters of the respective sub channels, the method having the steps of receiving an indication of signal qualities of the sub channels, and allocating the different subchannels of a given one of the channels to different user equipments according to the signal qualities.

The invention also provides a method of offering a data transmission service over a wireless network using the base station. The advantages of the invention can enable improvements to be made in the system or network performance such as being more reliable (better coverage of higher data rates for example) or more flexible, having a greater capacity, or being more cost effective. Consequently data transmission services over the network can be enhanced, and the value of such services can increase. Such increased value of services over the life of the system, could prove far greater than the sales value of the equipment.

Another aspect of the invention provides a base station for a wireless network for communicating over one or more channels to multiple user equipments, at least one of the channels having sub channels distinguishable by spatial separation of transmitters of the respective sub channels, the base station having are allocator for allocating more than one of the channels to a given one of the user equipments. This can include all the subchannels, or involve selecting the best subchannels from each channel.

An additional feature of some embodiments is the base station being arranged to cooperate with other base stations to allocate channels from more than one base station to the given user equipment.

The invention also provides user equipment for communicating with a base station of a wireless network over multiple channels, at least some of the channels having sub channels distinguishable by spatial separation of transmitters of the respective sub channels, the user equipment having a signal quality detector for measuring the signal quality of sub channels, and being arranged to use more than one of the channels simultaneously.

Any of the features can be combined with any of the aspects of the invention as would be apparent to those skilled in the art. Other advantages will be apparent to those skilled in the art.

BRIEF DESCRIPTION OF THE DRAWINGS

To show by way of example how the invention can be implemented, embodiments will now be described with reference to the figures in which:

FIGS. 2 and 3 show schematic views of embodiments of the invention using two base stations and user equipment, FIG. 4 shows a sequence chart of the arrangement of FIG. 2, FIG. 5 shows a schematic view of an embodiment using multiple MIMO channels from a single base station, and FIG. 6 shows a sequence chart of the arrangement of FIG. 5.

DETAILED DESCRIPTION OF PREFERRED EMBODIMENTS

Figure 1:
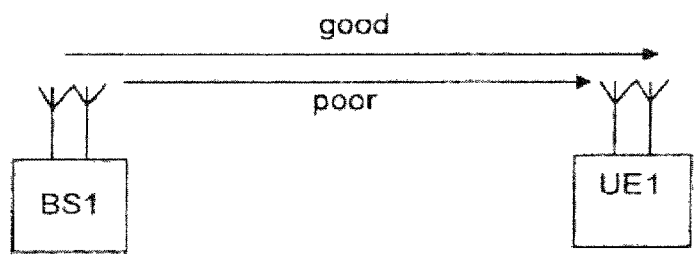
FIG. 1 shows a base station and user equipment of a prior art MIMO arrangement.
Figure 2:
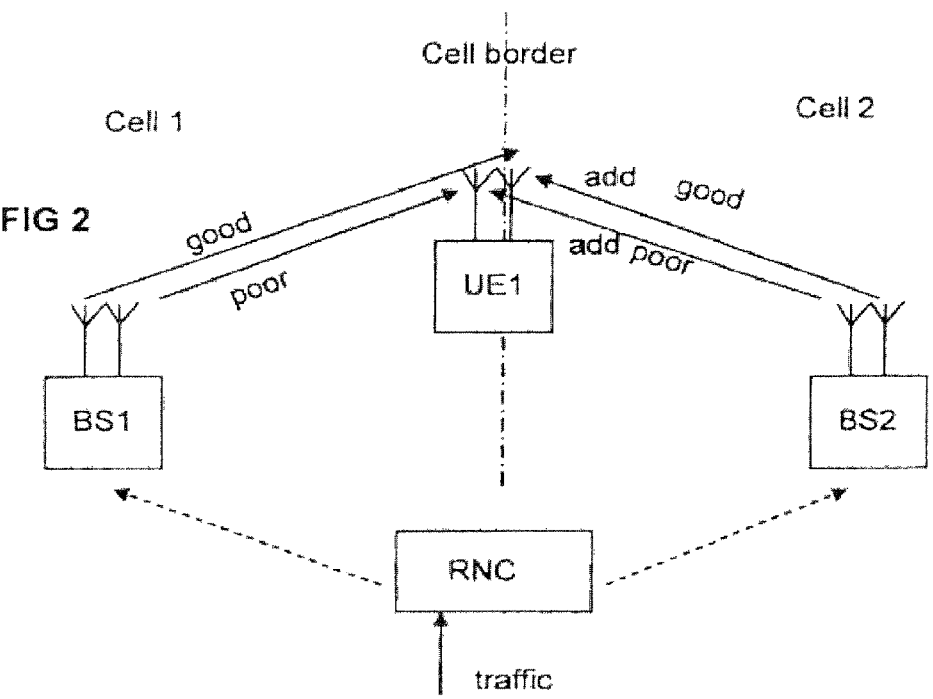

FIGS. 2 and 3 Embodiment Using Two Base Stations

FIG. 2 shows base station BS1 in cell 1 and base station 1352 in cell 2. User equipment UE1 is initially served by a MIMO channel from BS1 having subchannels 1 and 2. As UE1 moves towards BS2 it is additionally served by a MIMO Channel from BS2, without dropping the MIMO channel from BS1. This means that data rate coverage in call border regions can be improved, since UE1 has four subchannels to receive data. To achieve this, the traffic for UE1 needs to be split by an RNC (radio network controller) between BS1 and BS2. This can be implemented by signalling over management channels to advise the RNC which base stations can serve UE1, following conventional practice.

FIG. 3 shows another embodiment using two base stations. Similar elements are shown to those in FIG. 2 and corresponding reference signs are used where appropriate. In FIG. 3 two user equipments UE1 and UE2 are in a cell border region. UE1 is initially served by a MIMO channel from BS1. UE2 is initially served by a MIMO channel from BS2. Both MIMO channels have two subchannels. For each MIMO channel one of the subchannels is stronger than the other. If UE1 detects a stronger signal from BS2 than the poorer of its subchannels from BS1, it will request that it receives that stronger subchannel from BS2. Likewise if UE2 detects a stronger signal from BS1 it will request that it receives that stronger subchannel from BS1. As shown in the figure, UE1 will drop its poorer subchannel from BS1 and add a stronger subchannel from BS2. UE1 will ignore the poorer subchannel from BS2. Likewise UE2 will add the stronger subchannel from BS1, ignore the poorer subchannel from BS1 and drop its poorer from BS2. The respective subchannels which are dropped are taken up by the other user equipment which can achieve a higher data rate since there is better reception. Hence this swapping of subchannels can improve the data rate for both user equipments, and overall network capacity is improved in the cell border areas which are conventionally the areas of worst coverage.

FIG. 4, Sequence Chart for FIG. 2

This chart shows some of the principal actions of each of the entities. As a preliminary step BS1 and BS2 periodically report to the RNC Which base stations are nearest to a given UE. The RNC then sends all the traffic for a given UE to several "best" base stations. UE1 regularly measures pilot signal quality. Pilot signals are sent out by all base stations. If UE1 finds that the signal from BS2 is stronger than any other the subchannels it is currently using from BS1, it will report the measurements or request a change of allocation. The base stations will determine a new allocation according to the measurements for the requests. The new allocation information will be sent to UE1 over a management channel then transmissions can start to UE1 from both base stations.

FIG. 5 Embodiment Using Multiple MIMO Channels from a Single Base Station

FIG. 5 shows an embodiment in which there are multiple MIMO channels from a single base station. These channels can correspond to different sectors of the base station, or the same sector. User equipments UE1 and UE2 are served by base station BS1. Conventionally and initially UE1 is served on MIMO Channel 1 (subchannels 1 and 2) and UE2 is served on Channel 2 (subchannels 1 and 2). IF as shown subchannel 2 of channel 1 becomes poor in terms of signal quality, it can be dropped. If subchannel 1 of channel 2 becomes poor it can be dropped. If the signal quality of these poor channels is better at another UE, then a reallocation of sub channels can to place. As shown, UE1 is now served on channel 1 subchannel 1 and channel 2 sub-channel 1. UE2 is now served on channel 1 subchannel 2 and channel 2 sub-channel 2. Coverage can be improved (UE1 and UE2 have improved their data rate). In addition the network capacity can be improved. This represents a way of optimising for network capacity while also improving coverage shown operating in a single cell.

FIG. 6, Sequence Chart for the Embodiment of FIG. 5

FIG. 6 shows a sequence chart for the embodiment of FIG. 5. As before, the user equipment measures pilot signal quality. UE1 and UE2 send measurement information or request service on the best sub channels. BS1 then allocates the subchannels according to the measurements or according to the requests. The allocation information is sent to UE1 and UE2 over a management channel. Then transmission of the traffic can begin.

CONCLUDING REMARKS

As has been described above, a base station for a wireless network uses one or more MIMO) channels having subchannels, to communicate with multiple user equipments, and allocates the sub channels to the user equipments. Different subchannels of a given one of the channels can be allocated to different user equipments. The ability to allocate sub channels individually, rather than only allocating entire channels can enable higher data rates can be achieved. This is particularly useful for improving data rates at cell boundaries or sector boundaries, where the coverage is traditionally weakest. A user equipment can use subchannels from different MIMO channels from different sectors or from different base stations. Other variations will be apparent to those skilled in the art, having corresponding advantages to those set out above, within the scope of the claims.

What is claimed is:

1. A base station for operation as part of a wireless network, the base station comprising:
   a first plurality of antennas configured for a first sector of the base station;
   a second plurality of antennas configured for a second sector of the base station;
   a first transceiver coupled to the first plurality of antennas and configured to transmit through a first MIMO channel between the first transceiver and a UE device;
   a second transceiver coupled to the second plurality of antennas and configured to transmit through a second MIMO channel between the second transceiver and the UE device;
   control logic configured to:
      (a) direct the first transceiver to stop transmission on a given subchannel of the first MIMO channel and continue transmission on one or more remaining subchannels of the first MIMO channel; and
      (b) direct the second transceiver to start transmission on a given subchannel of the second MIMO channel while said first transceiver is transmitting on the one or more remaining subchannels of the first MIMO channel.

2. The base station of claim 1, wherein the control logic is configured to perform (a) and (b) in response to a determination that the given subchannel of the second MIMO channel has better signal quality than the given subchannel of the first MIMO channel.

3. The base station of claim 1, wherein the control logic is configured to perform (a) and (b) in response to a determination that the UE device has requested that the base station:
   stop transmitting to the UE device via the given subchannel of the first MIMO channel; and
   start transmitting to the UE device via the given subchannel of the second MIMO channel.

4. The base station of claim 1, wherein the first MIMO channel is a 2×2 MIMO channel, and/or, the second MIMO channel is a 2×2 MIMO channel.

5. The base station of claim 1, wherein the first transceiver is configured to receive from the UE device indicators of signal quality of subchannels of the first MIMO channel and indicators of signal quality of subchannels of the second MIMO channel.

6. The base station of claim 1, wherein the given subchannel of the second MIMO channel is the subchannel of the second MIMO channel with the best signal quality among the subchannels of the second MIMO channel.

7. The base station of claim 1, wherein the wireless network also includes a controller configured to:
   receive data destined for the UE device, and
   dynamically partition the data into (a) first data to be transmitted to the UE device via the first transceiver over the first MIMO channel and (b) second data to be transmitted to the UE device via the second transceiver over the second MIMO channel.

8. The base station of claim 7, wherein said dynamical partitioning is controlled by control information provided by the first transceiver and the second transceiver.

9. A method comprising:
   performing operations at a base station, wherein the base station includes a first transceiver for a first sector of the base station and a second transceiver for a second sector of the base station, wherein the first transceiver is configured to transmit through a first MIMO channel between the first transceiver and a UE device, wherein the second transceiver is configured to transmit through a second MIMO channel between the second transceiver and the UE device, wherein the operations include:
      (a) directing the first transceiver to stop transmission on a given subchannel of the first MIMO channel and continue transmission on one or more remaining subchannels of the first MIMO channel; and
      (b) directing the second transceiver to start transmission on a given subchannel of the second MIMO channel while said first transceiver is transmitting on the one or more remaining subchannels of the first MIMO channel.

10. The method of claim 9, wherein (a) and (b) are performed in response to a determination that the given subchannel of the second MIMO channel has better signal quality than the given subchannel of the first MIMO channel.

11. The method of claim 9, wherein (a) and (b) are performed in response to a determination that the UE device has requested that the base station:
   stop transmitting via the given subchannel of the first MIMO channel; and
   start transmitting via the given subchannel of the second MIMO channel.

12. The method of claim 9, wherein the operations also include:
   receiving from the UE device indicators of signal quality of subchannels of the first MIMO channel; and
   receiving from the UE device indicators of signal quality of subchannels of the second MIMO channel.

13. The method of claim 9, wherein the operations also include:
   transmitting pilots on each of the subchannels of the first MIMO channel; and
   transmitting pilots on each of the subchannels of the second MIMO channel.

14. The method of claim 9, wherein the given subchannel of the second MIMO channel is the subchannel of the second MIMO channel with the best signal quality among the subchannels of the second MIMO channel.

15. A non-transitory memory medium storing program instructions, wherein the program instructions, when executed by a processor, cause the processor to implement:
   performing operations at a base station, wherein the base station includes a first transceiver for a first sector and a second transceiver for a second sector, wherein the first transceiver is configured to transmit through a first MIMO channel between the first transceiver and a UE device, wherein the second transceiver is configured to transmit through a second MIMO channel between the second transceiver and the UE device, wherein the operations include:
      (a) directing the first transceiver to stop transmission on a given subchannel of the first MIMO channel and continue transmission on one or more remaining subchannels of the first MIMO channel; and
      (b) directing the second transceiver to start transmission on a given subchannel of the second MIMO channel while said first transceiver is transmitting on the one or more remaining subchannels of the first MIMO channel.

16. The non-transitory memory medium of claim 15, wherein (a) and (b) are performed in response to a determination that the given subchannel of the second MIMO channel has better signal quality than the given subchannel of the first MIMO channel.

17. The non-transitory memory medium of claim 15, wherein (a) and (b) are performed in response to a determination that the UE device has requested that the base station:
   stop transmitting via the given subchannel of the first MIMO channel; and
   start transmitting via the given subchannel of the second MIMO channel.

18. The non-transitory memory medium of claim 15, wherein the operations also include:
   receiving from the UE device indicators of signal quality of subchannels of the first MIMO channel; and
   receiving from the UE device indicators of signal quality of subchannels of the second MIMO channel.

19. The non-transitory memory medium of claim 15, wherein the operations also include:
   transmitting pilots on each of the subchannels of the first MIMO channel; and
   transmitting pilots on each of the subchannels of the second MIMO channel.

20. The non-transitory memory medium of claim 15, wherein the given subchannel of the second MIMO channel is the subchannel of the second MIMO channel with the best signal quality among the subchannels of the second MIMO channel.

\* \* \* \* \*